Dec. 24, 1940.   C. W. HART   2,226,377
CRAYON
Filed Jan. 24, 1939

Inventor,
Coleridge W. Hart,
By Samuel W Balch
Attorney.

Patented Dec. 24, 1940

2,226,377

UNITED STATES PATENT OFFICE 2,226,377

CRAYON

Coleridge W. Hart, Peekskill, N. Y.

Application January 24, 1939, Serial No. 252,622

2 Claims. (Cl. 106—5)

The object of this invention is to produce a black crayon having a high content of refined charcoal, for writing on sand-blasted glass, which is used in place of school blackboards, and also on paper and on other material with a suitably roughened surface. A further object is to produce a crayon which will make a very black mark with ready erasability. A further object is to produce a crayon that is soft, medium soft, or medium hard as may be desired. A further object is to produce a crayon with its surface hard enough not to soil the fingers, but only so hard as to wear away from the point as it is being used.

In the accompanying sheet of drawings which forms a part of this description:

Figure 1:
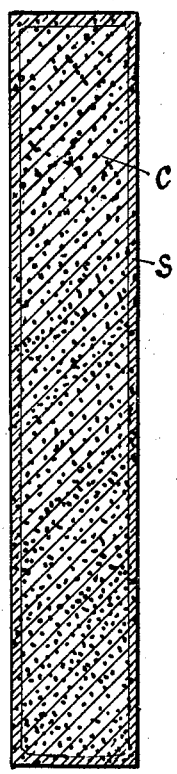
Figure 1 is a lengthwise section through a crayon which embodies this invention.
Figure 2:
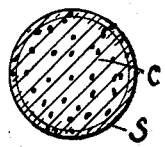
Figure 2 is a transverse section.

Wood charcoal, either activated or unactivated, and finely pulverized, is the major ingredient. This is combined in the proportion by weight of six parts of charcoal and one of silicate of magnesia, suitably pulverized soapstone. To make this compactable, there is added one part by weight of adhesive material, as gum arabic dissolved in water. Other adhesives, as gum tragacanth, paste, starch, or glue, may be substituted or used in part. These ingredients are thoroughly mixed to a nearly dry paste, and are next molded or extruded under pressure to the desired form, removed from the mold and dried. The quantity of charcoal may be varied ten per centum either way and the quantity of silicate of magnesia five per centum either way, depending on the desired texture and the purpose for which the crayon is to be used. The interior body $c$ of the crayon remains with the mixture as above given, but, in order not to soil the fingers at and close to the surface $s$, it is made a little or much harder than the rest. This is effected by dipping or spraying for one second or more in or with a hardner, such as a mixture of one part of molasses, one part of gum arabic or gum tragacanth, and five parts of water. Due to the absorbent property of the charcoal and the brief period during which it is dipped, this hardner penetrates to but a slight depth.

I claim:

1. A crayon comprising a compacted mixture of finely pulverized charcoal, pulverized silicate of magnesia, and a binder of adhesive material, the charcoal being largely in excess of the other ingredients.

2. A crayon comprising a compacted mixture of finely pulverized charcoal, pulverized soapstone, and a binder of gum arabic, the charcoal being largely in excess of the other ingredients.

COLERIDGE W. HART.